US012532121B2

(12) United States Patent
Ren et al.

(10) Patent No.: US 12,532,121 B2
(45) Date of Patent: Jan. 20, 2026

(54) SPEAKER DEVICE AND STYLUS

(71) Applicant: AAC Microtech (Changzhou) Co., Ltd., Jiangsu (CN)

(72) Inventors: Zhang Ren, Changzhou (CN); Zhiwei Zhong, Changzhou (CN); Wei Song, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 157 days.

(21) Appl. No.: 18/519,112

(22) Filed: Nov. 27, 2023

(65) Prior Publication Data

US 2025/0133346 A1 Apr. 24, 2025

Related U.S. Application Data

(63) Continuation of application No. PCT/CN2023/125482, filed on Oct. 19, 2023.

(51) Int. Cl.

*H04R 9/02* (2006.01)
*G06F 3/0354* (2013.01)
*H04R 1/28* (2006.01)
*H04R 7/12* (2006.01)
*H04R 7/16* (2006.01)

(52) U.S. Cl.

CPC ........... *H04R 9/025* (2013.01); *H04R 1/2811* (2013.01); *H04R 7/12* (2013.01); *H04R 7/16* (2013.01); *G06F 3/03545* (2013.01)

(58) Field of Classification Search

CPC ........ H04R 9/025; H04R 1/2811; H04R 7/12; H04R 7/16; G06F 3/03545

See application file for complete search history.

(56) References Cited

U.S. PATENT DOCUMENTS

2024/0073620 A1* 2/2024 Ren .......................... H04R 7/18
2025/0133347 A1* 4/2025 Ren .......................... H04R 1/24

FOREIGN PATENT DOCUMENTS

CN 218416661 U * 1/2023 ............... H04R 9/06
CN 218473384 U * 2/2023

OTHER PUBLICATIONS

Machine translation of Cn218416661U 2023.*
Machine translation of CN218473384U 2023.*

* cited by examiner

*Primary Examiner* — Andrew Sniezek
(74) *Attorney, Agent, or Firm* — Wiersch Law Group

(57) ABSTRACT

The present application provides a speaker device and a stylus, and the speaker device includes: a first frame, a first vibration system, a magnetic circuit system, a second frame, and a second vibration system. The magnetic circuit system includes a first splint, a first magnetic steel unit, a second splint, a center splint, and a second magnetic steel unit; at least part of an edge of the first splint is provided with a first flip bent and extended in a direction close to the second splint, and/or at least part of an edge of the second splint is provided with a second flip bent and extended in a direction close to the first splint. The magnetic circuit system further includes side magnets fixed to the first splint or the second splint. The speaker device reduces the magnetic leakage and avoids the occurrence of non-linear strokes of a stylus.

9 Claims, 4 Drawing Sheets

A-A

B-B

SPEAKER DEVICE AND STYLUS

CROSS-REFERENCE TO RELATED APPLICATIONS

This application is a continuation of International Application No. PCT/CN2023/125482, filed Oct. 19, 2023, the entire contents of which are incorporated herein by reference.

TECHNICAL FIELD

The present application relates to the field of electroacoustic conversion, in particular to a speaker device and a stylus.

BACKGROUND

The speaker device is a transducer that converts electrical signals into sound signals. It primarily consists of a frame, a vibration system fixed to the frame, and a magnetic circuit system that drives the vibration system to vibrate.

When the speaker device is used for a stylus, it is necessary to ensure that the magnetic leakage of the speaker device meets certain standards. In the related art, the magnetic circuit system of the sounding driver is fixed to the frame through a lower splint, causing magnetic leakage at the four corners of the lower splint. However, this structural arrangement leads to excessive magnetic leakage, resulting in non-straight lines when using the stylus. In other words, the magnetic leakage of the speaker device in the related art cannot meet the standard, easily causing the occurrence of non-linear strokes when using the stylus.

Therefore, it is necessary to provide a new speaker device to solve the above technical problem.

SUMMARY

An object of the present application is to provide a speaker device and a stylus to solve the problem that the magnetic leakage of the speaker device in the related art cannot meet the magnetic leakage standard of the stylus, which is likely to cause the occurrence of non-linear strokes when using the stylus.

In order to achieve the above object, the present application provides a speaker device, comprising:

a first frame;

a first vibration system, comprising:

a first diaphragm, an outer periphery of which is fixed to the first frame; and a first voice coil configured to drive the first diaphragm to vibrate;

a magnetic circuit system fixed to the first frame, comprising:

a first splint;

a first magnetic steel unit fixed to the first splint; and a second splint;

wherein the first magnetic steel unit comprises a first main magnetic steel and first sub-magnetic steels around the first main magnetic steel and spaced apart from each other to form a first magnetic gap; the first voice coil is inserted and suspended in the first magnetic gap, the second splint being fixedly stacked on the first sub-magnetic steels, and the second splint is fixedly stacked on the first sub-magnetic steels; the first splint or the second splint is fixed to the first frame; the magnetic circuit system further comprises a center splint fixedly stacked on the first main magnetic steel and a second magnetic steel unit fixedly stacked on the center splint, the second magnetic steel unit comprises a second main magnetic steel fixed to the center splint and second sub-magnetic steels around the second main magnetic steel and spaced apart from each other to form a second magnetic gap;

a second frame, fixedly supported on a top of the second sub-magnetic steels;

a second vibration system, comprising:

a second diaphragm, an outer periphery of which is fixed to the second frame; and a second voice coil, which is configured to drive the second diaphragm to vibrate, and inserted and suspended in the second magnetic gap second voice coil;

wherein at least part of an edge of the first splint is provided with a first flap bent and extended in a direction close to the second splint, and/or at least part of an edge of the second splint is provided with a second flap bent and extended in a direction close to the first splint;

wherein the magnetic circuit system further comprises side magnetic steels fixed to the first splint or the second splint, wherein the side magnetic steels are located on a side of the first sub-magnetic steels away from the first main magnet; a magnetization direction of the side magnetic steel is opposite to the magnetization direction of the first sub-magnetic steel, and the side magnetic steels form a magnetic circuit together with the first sub-magnetic steels.

In one embodiment, the magnetic circuit system is rectangular in shape, and the first flap is formed by bending two short-axis edges of the first splint and/or two long-axis edges of the first splint, respectively.

In one embodiment, the first flap is formed by bending four corners of the first splint, respectively.

In one embodiment, the magnetic circuit system is rectangular in shape, and the second flap is formed by bending two short-axis edges of the second splint and/or two long-axis edges of the second splint.

In one embodiment, the second flap is formed by four corners of the second splint.

In one embodiment, the magnetic circuit system is rectangular in shape; the first sub-magnetic steels comprise four, and the four first sub-magnetic steels are located on each of four peripheral sides of the first main magnetic steel, respectively; the second sub-magnetic steels are annular in shape; there are a plurality of the side magnetic steels fixed to the two short-axis sides of the first splint or two long-axis sides of the first splint.

In one embodiment, the side magnetic steels are also fixed to four corners of the first splint.

In one embodiment, the first vibration system further comprises an elastic support member, wherein one end of the elastic support member is fixed to the first frame, and the other end of the elastic support member is fixed to the first diaphragm.

In one embodiment, the first diaphragm is a bi-fold ring structure, wherein an inner periphery of the bi-fold ring of the first diaphragm is fixed to a top of the second sub-magnetic steels.

The present application further provides a stylus, comprising any one of the above-mentioned speaker devices.

Compared with the related art, in the speaker device of the present application, at least part of an edge of the first splint is provided with a first flip bent and extended in a direction close to the second splint, and/or at least part of an edge of the second splint is provided with a second flip bent and extended in a direction close to the first splint. Besides, side magnetic steels fixed to the first splint or the second splint are located a side of the first sub-magnetic steels away from the first main magnetic steel. A magnetization direction of the side magnetic steels are opposite to a magnetization direction of the first sub-magnetic steels, so that the side magnetic steels and the first sub-magnetic steels collectively form a magnetic circuit. This arrangement, along with the first flip and/or second flip and the additional side magnetic steels, helps reduce the magnetic leakage in the magnetic circuit system, ensuring that the magnetic leakage of the speaker device meets the magnetic leakage standard of a stylus, thereby avoiding the occurrence of non-linear strokes when the speaker device applied to a stylus.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

Figure 1:
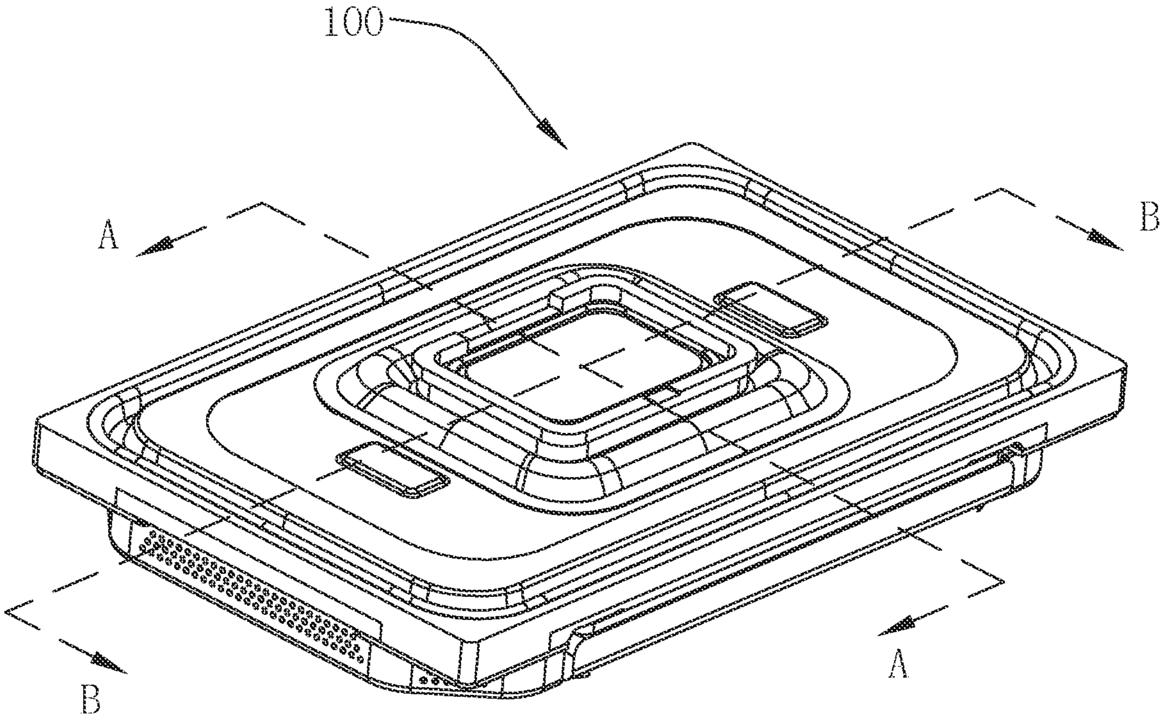
FIG. 1 shows a three-dimensional structural diagram of a speaker device according to an embodiment of the present application.

In the figures, 100, speaker device; 1, first frame; 2, first vibration system; 21, first diaphragm; 22, first voice coil; 23, elastic support member; 3, magnetic circuit system; 31, first splint; 311, first flap; 32, first magnetic steel unit; 321, first main magnetic steel; 322, first sub-magnetic steel; 33, second splint; 34, side magnetic steel; 35, center splint; 36, second magnetic steel unit; 361, second main magnetic steel; 362, second sub-magnetic steel; 37, edge splint; 4, second frame; 5, second vibration system; 51, second diaphragm; 52, second voice coil; 6, back cover; 61, sound outlet hole; 10, first magnetic gap; 20, second magnetic gap; 30, sounding inner cavity.

DETAILED DESCRIPTION OF THE EMBODIMENTS

Unless otherwise defined, all technical and scientific terms used herein have the same meanings as are commonly understood by those skilled in the art to which this application belongs. The terms used herein in the specification of the present application are used only for the purpose of describing specific embodiments, and are not intended to limit the present application. The terms "include" and "have" and any variations thereof, as used in the specification, the claims, and the above-mentioned accompanying description of the present application, are intended to cover non-exclusive inclusion. The terms "first", "second", etc., in the specification, the claims, and the above-mentioned accompanying description of the present application are used to distinguish between different objects and are not intended to describe a particular order.

The term "embodiment" used in this document implies that particular features, structures, or characteristics described in the embodiments may be included in at least one embodiment of the present application. The presence of the phrase at various points in the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

It should be noted that the terms "up", "down", "left", "right" and the like in the embodiments of the present application are made with reference to the illustrations in the accompanying drawings, and should not be construed as limiting embodiments of the present application. Furthermore, it should be understood that in the document, when referring to an element that constitutes an element "above" or "below" another element, it is possible that the element constitutes an element "above" or "below" another element directly, or that the element constitutes an element "above" or "below" another element through an intermediate element.

The technical solutions in the embodiments of the present application will be described clearly and completely in the following in conjunction with the accompanying drawings in the embodiments of the present application. Obviously, the described embodiments are only a part of the embodiments of the present application, and not all of the embodiments. Based on the embodiments in the present application, all other embodiments obtained by those of ordinary skill in the art without creative labor fall within the protection scope of the present application.

Figure 2:
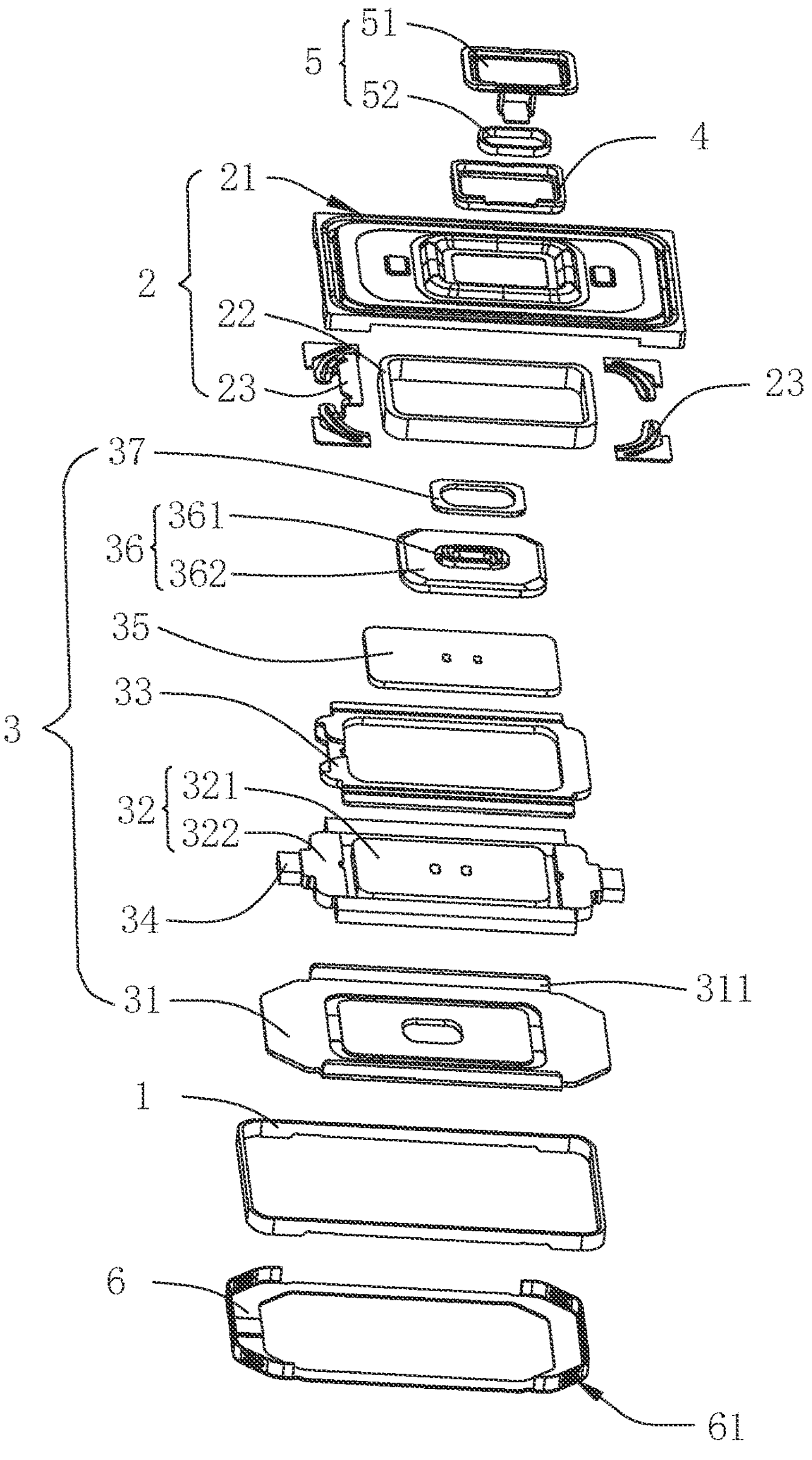
FIG. 2 shows an exploded view of the speaker device according to an embodiment of the present application.
Figure 3:
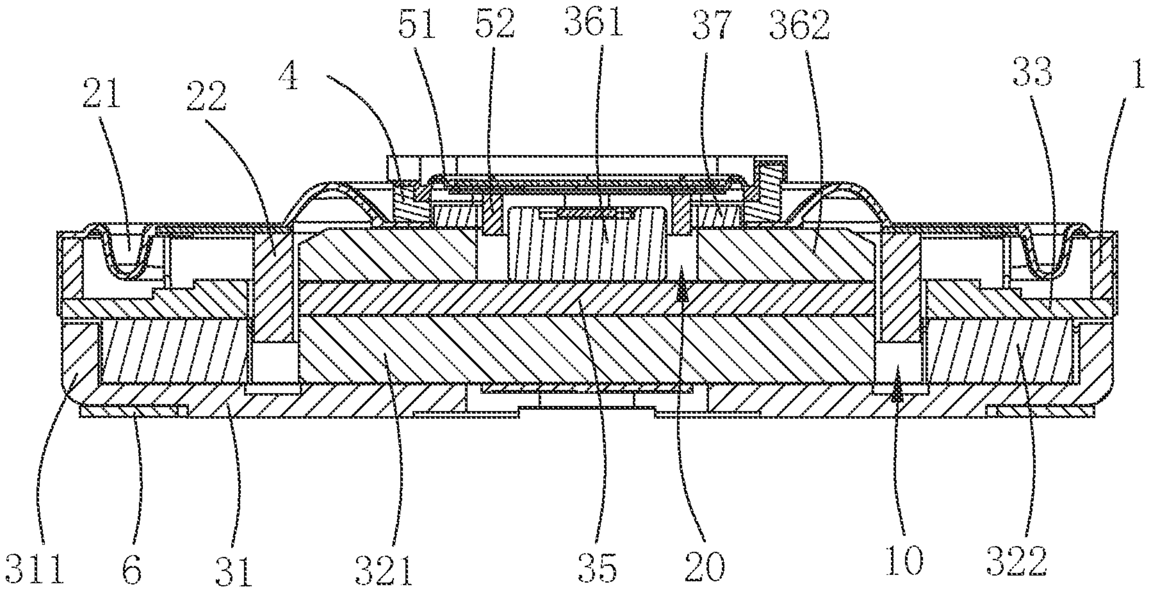
FIG. 3 shows a sectional view of line A-A in FIG. 1.
Figure 4:
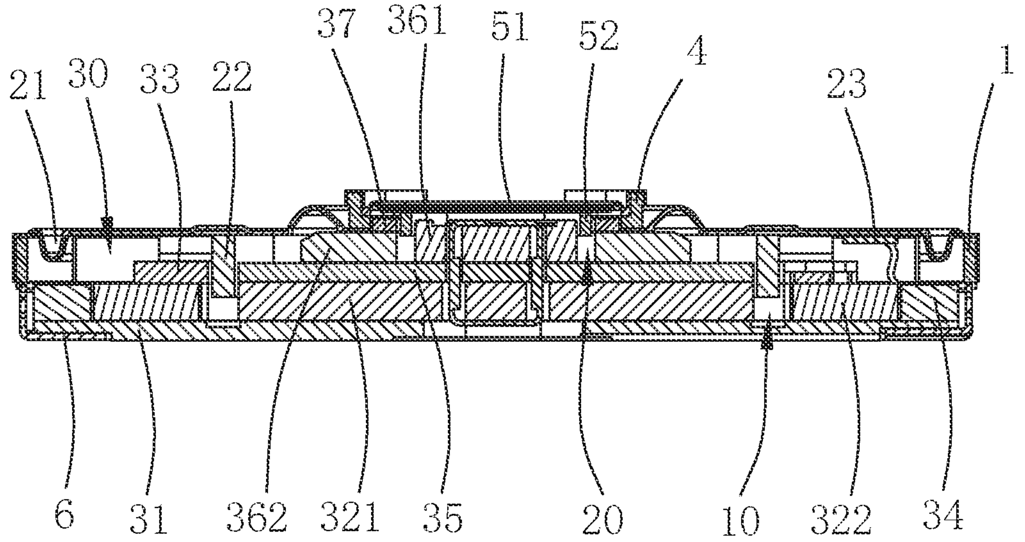
FIG. 4 shows a sectional view of line B-B in FIG. 1.

As shown in FIGS. 1 to 4, an embodiment of the present application provides a speaker device 100, including a first frame 1, a first vibration system 2, and a magnetic circuit system 3.

The first vibration system 2 includes a first diaphragm 21 fixed to the first frame 1 at its outer periphery and a first voice coil 22 configured to drive the first diaphragm 21 to vibrate. The magnetic circuit system 3 is fixed to the first frame 1 and is configured to drive the first vibration system 2 to vibrate. The magnetic circuit system 3 includes a first splint 31, a first magnetic steel unit 32 fixed to the first splint 31, and a second splint 33. The first magnetic steel unit 32 includes a first main magnetic steel 321 and a first sub-magnetic steel 322 arranged around the first main magnetic steel 321 and spaced apart from each other to form a first magnetic gap 10. The first voice coil 22 inserted and suspended in the first magnetic gap 10, and the second splint 33 is fixedly stacked on the first sub-magnetic steel 322. The first splint 31 or the second splint 33 is fixed to the first frame 1.

At least part of an edge of the first splint 31 is provided with a first flap 311 bent and extended in a direction close to the second splint 33, and/or at least part of an edge of the second splint 33 is provided with a second flap bent and extended in a direction close to the first splint 31.

The magnetic circuit system 3 further includes side magnetic steels 34 fixed to the first splint 31 or the second splint 33. The side magnetic steels 34 is located on a side of the first sub-magnets 322 away from the first main magnetic steel 321, and a magnetization direction of the side magnetic steels 34 is opposite to a magnetization direction of the first sub-magnetic steels 322, and the side magnetic steels 34 form a magnetic circuit together with the first sub-magnetic steels 322, so as to counteract the magnetic field overflow.

In this embodiment, the first vibration system 2 further includes an elastic support member 23. One end of the elastic support member 23 is fixed to the first frame 1, and the other end of the elastic support member 23 is fixed to the first diaphragm 21.

In this embodiment, the magnetic circuit system 3 is rectangular in shape, so that the first splint 31 and the first main magnetic steel 321 are also rectangular in shape. The first sub-magnetic steels 322 includes four. Two of the first sub-magnets 322 are arrange on two short-axis sides of the first main magnetic steel 321, and the other two of the first sub-magnets 322 are arrange on two long-axis sides of the first main magnetic steel 321.

Specifically, the first flap 311 is formed by bending the two short-axis sides of the first splint 31 and/or the two long-axis sides of the first splint 31. That is, the first flap 311 may be provided in two or four parts. If the first flap 311 is provided in two parts, it is formed by bending the two short-axis sides of the first splint 31 or the two long-axis sides of the first splint 31. If the first flap 311 is provided in four parts, it is formed by bending the two short-axis sides of the first splint 31 and the two long-axis sides of the first splint 31.

The first flap 311 may also be formed by bending each of four corners of the first splint 31. That is, if the first flap 311 is provided in four parts, it may also be formed by bending the four corners of the first splint 31. Of course, according to the practical requirements, the first flap 311 may also be provided in six or eight parts. If the first flap 311 is provided in six parts, four parts of the first flap 311 are formed by bending the four corners of the first splint 31, and the other two parts thereof are formed by bending the two short-axis sides of the first splint 31. If the first flap 311 is provided in eight parts, four parts of the first flap 311 are formed by bending the four corners of the first splint 31, and the other four parts thereof are formed by bending the two short-axis sides and two long-axis sides of the first splint 31.

The second flap is formed by bending the two short-axis sides and/or the two long-axis sides of the second splint 33. The second flap may also be formed by bending the four corners of the second splint 33. That is, the second flap is set in the same way as the first flap 311, which will not be repeated herein.

In this embodiment, the first flap 311 is provided in two parts and is formed by bending the two long-axis sides of the first splint 31. The second splint 33 is not provided with the second flap.

Specifically, there are a plurality of the side magnetic steels 34, which are fixed to the two short-axis sides of the first splint 31 or the two long-axis sides of the first splint 31. or two long-axis sides of the first splint 31.

The side magnetic steels 34 may also be fixed to the four corners of the first splint 31. That is, the side magnetic steels 34 include four, and each is fixed to each of the four corners of the first splint 31. Of course, according to practical requirements, the side magnetic steels 34 may also be six or eight. If the side magnetic steels 34 include six, four of them are fixed to the four corners of the first splint 31, and the other two are fixed to the two short-axis sides or two long-axis sides of the first splint 31. If the side magnetic steels 34 include eight, four of them are fixed to the four corners of the first splint 31, and the other four are fixed to the two short-axis sides and two long-axis sides of the first splint 31.

In this embodiment, the side magnetic steels 34 include two, which are fixed to the two short-axis sides of the first splint 31.

Specifically, the magnetic circuit system 3 includes a center splint 35 fixedly stacked on the first main magnetic steel 321 and a second magnetic steel unit 36 fixedly stacked on the center splint 35. The second magnetic steel unit 36 includes a second main magnetic steel 361 fixed to the center splint, and second sub-magnetic steels 362 around the second main magnetic steel 361 and spaced apart from each other to form a second magnetic gap 20. The second sub-magnetic steels 362 is in a ring-like structure.

In this embodiment, the magnetic circuit system 3 further includes a side splint 37 fixedly stacked on the second sub-magnetic steels 362.

Specifically, the sound device 100 further includes a second frame 4 fixedly supported on a top of the second sub-magnetic steels 362, and a second vibration system 5 fixed to the second frame 4. The second vibration system 5 includes a second diaphragm 51 fixed to the second frame 4 at an outer edge, and a second voice coil 52 configured to drive the second diaphragm 51 to vibrate and emit sound. The second voice coil 52 is inserted and suspended in the second magnetic gap 20.

In this embodiment, the sound device 100 further includes a ring-shaped back cover 6. An outer peripheral edge of the back cover 6 is fixed to the first frame 1, and an inner periphery of the back cover 6 is fixed to the first splint 31. The back cover 6 is provided with sound outlet holes 61, which is arranged through the back cover 6. The back cover 6, the first frame, the first vibration system 2, the magnetic circuit system 3, the second frame, and the second vibration system 5 collectively enclose to form a sounding inner cavity 30. The sound outlet holes 61 connect the inner cavity 30 to the outside world.

In the speaker device 100 of this embodiment, at least part of an edge of the first splint 31 is provided with a first flip 311 bent and extended in a direction close to the second splint 32, and/or at least part of an edge of the second splint 32 is provided with a second flip bent and extended in a direction close to the first splint 31. Besides, side magnetic steels 34 fixed to the first splint 31 or the second splint 32 are located a side of the first sub-magnetic steels 322 away from the first main magnetic steel 321. A magnetization direction of the side magnetic steels 34 is opposite to a magnetization direction of the first sub-magnetic steels 322, so that the side magnetic steels 34 and the first sub-magnetic steels 322 collectively form a magnetic circuit. This arrangement, along with the first flip 311 and/or second flip and the additional side magnetic steels 34, helps reduce the magnetic leakage in the magnetic circuit system 3, ensuring that the magnetic leakage of the speaker device 100 meets the magnetic leakage standard of a stylus, thereby avoiding the occurrence of non-linear strokes when the speaker device applied to a stylus.

The embodiments of the present application further provide a stylus including the above-mentioned speaker device 100, and since the stylus in this embodiment includes the above-mentioned speaker device 100, it can also achieve the technical effect that the above-mentioned speaker device 100 can achieve, which will not be repeated herein.

It should be noted that the above embodiments described with reference to the accompanying drawings are only for illustrating the present application rather than limiting the scope of the present application. It should be understood that those of ordinary skill in the art should understand that modifications or equivalent replacements to the present application without departing from the spirit and scope of the present application should be covered within the scope of the present application. Furthermore, unless the context otherwise indicates, words appearing in the singular form include the plural form and vice versa. Furthermore, unless specifically stated, all or part of any embodiment may be used in conjunction with all or part of any other embodiment.

What is claimed is:

1. A speaker device, comprising:

a first frame;

a first vibration system, comprising:

a first diaphragm, an outer periphery of which is fixed to the first frame; and a first voice coil configured to drive the first diaphragm to vibrate;

a magnetic circuit system fixed to the first frame, comprising:

a first splint;

a first magnetic steel unit fixed to the first splint; and a second splint;

wherein the first magnetic steel unit comprises a first main magnetic steel and first sub-magnetic steels around the first main magnetic steel and spaced apart from each other to form a first magnetic gap; the first voice coil is inserted and suspended in the first magnetic gap, the second splint being fixedly stacked on the first sub-magnetic steels, and the second splint is fixedly stacked on the first sub-magnetic steels; the first splint or the second splint is fixed to the first frame; the magnetic circuit system further comprises a center splint fixedly stacked on the first main magnetic steel and a second magnetic steel unit fixedly stacked on the center splint; the second magnetic steel unit comprises a second main magnetic steel fixed to the center splint and second sub-magnetic steels around the second main magnetic steel and spaced apart from each other to form a second magnetic gap;

a second frame, fixedly supported on a top of the second sub-magnetic steels;

a second vibration system, comprising:

a second diaphragm, an outer periphery of which is fixed to the second frame; and a second voice coil, which is configured to drive the second diaphragm to vibrate, and inserted and suspended in the second magnetic gap second voice coil;

wherein at least part of an edge of the first splint is provided with a first flap bent and extended in a direction close to the second splint, and/or at least part of an edge of the second splint is provided with a second flap bent and extended in a direction close to the first splint;

wherein the magnetic circuit system further comprises side magnetic steels fixed to the first splint or the second splint, wherein the side magnetic steels are located on a side of the first sub-magnetic steels away from the first main magnet; a magnetization direction of the side magnetic steels are opposite to the magnetization direction of the first sub-magnetic steels, and the side magnetic steels form a magnetic circuit together with the first sub-magnetic steels.

2. The speaker device of claim 1, wherein the magnetic circuit system is rectangular in shape, and the first flap is formed by bending two short-axis edges of the first splint and/or two long-axis edges of the first splint, respectively.

3. The speaker device of claim 2, wherein the first flap is formed by bending four corners of the first splint.

4. The speaker device of claim 1, wherein the magnetic circuit system is rectangular in shape, and the second flap is formed by bending two short-axis edges of the second splint and/or two long-axis edges of the second splint.

5. The speaker device of claim 4, wherein the second flap is formed by four corners of the second splint.

6. The speaker device of claim 1, wherein the magnetic circuit system is rectangular in shape; the first sub-magnetic steels comprise four, and the four first sub-magnetic steels are located on each of four peripheral sides of the first main magnetic steel, respectively; the second sub-magnetic steels are annular in shape; there are a plurality of the side magnetic steels fixed to the two short-axis sides of the first splint or two long-axis sides of the first splint.

7. The speaker device of claim 6, wherein the side magnetic steels are also fixed to four corners of the first splint.

8. The speaker device of claim 1, wherein the first vibration system further comprises an elastic support member, wherein one end of the elastic support member is fixed to the first frame, and the other end of the elastic support member is fixed to the first diaphragm.

9. The speaker device of claim 1, wherein the first diaphragm is a bi-fold ring structure, wherein an inner periphery of the bi-fold ring of the first diaphragm is fixed to a top of the second sub-magnetic steels.

* * * * *